(12) United States Patent
Shawver et al.

(10) Patent No.: US 10,528,566 B2
(45) Date of Patent: Jan. 7, 2020

(54) TIME SERIES DATA QUERY ENGINE

(71) Applicant: Referentia Systems, Inc., Honolulu, HI (US)

(72) Inventors: Matthew Shawver, East Greenwich, RI (US); Anthony Commendador, Honolulu, HI (US); Wenyi Zhou, Honolulu, HI (US)

(73) Assignee: REFERENTIA SYSTEMS, INC., Honolulu, HI (US)

( * ) Notice: Subject to any disclaimer, the term of this patent is extended or adjusted under 35 U.S.C. 154(b) by 232 days.

(21) Appl. No.: 15/639,755

(22) Filed: Jun. 30, 2017

(65) Prior Publication Data

US 2018/0004812 A1    Jan. 4, 2018

Related U.S. Application Data

(60) Provisional application No. 62/357,116, filed on Jun. 30, 2016, provisional application No. 62/357,178, filed on Jun. 30, 2016, provisional application No. 62/357,193, filed on Jun. 30, 2016, provisional application No. 62/357,210, filed on Jun. 30, 2016.

(51) Int. Cl.
*G06F 16/22* (2019.01)
*G06F 16/2455* (2019.01)
*G06F 16/2458* (2019.01)

(52) U.S. Cl.
CPC ........ *G06F 16/24553* (2019.01); *G06F 16/22* (2019.01); *G06F 16/2282* (2019.01); *G06F 16/2474* (2019.01)

(58) Field of Classification Search
None
See application file for complete search history.

(56) References Cited

U.S. PATENT DOCUMENTS

| | | | |
|---|---|---|---|
| 9,148,483 B1* | 9/2015 | Molettiere | H04L 67/22 |
| 2003/0095631 A1* | 5/2003 | Rosner | G01N 23/02 378/98.12 |
| 2012/0254174 A1 | 10/2012 | Mitra et al. | |
| 2012/0303548 A1* | 11/2012 | Johnson | G06Q 40/04 705/36 R |
| 2013/0039587 A1* | 2/2013 | Zhang | G06K 9/00711 382/201 |
| 2013/0235201 A1* | 9/2013 | Kiyohara | G06K 9/00805 348/148 |

(Continued)

*Primary Examiner* — Wilson Lee
(74) *Attorney, Agent, or Firm* — Mintz, Levin, Cohn, Ferris, Glovsky and Popeo P.C.

(57) ABSTRACT

In one aspect, there is provided a system configured to receive time series data collected by a first sensor. The time series data collected by the first sensor can be stored in a first data array associated with the first sensor. The first data array can stored proximate to a second data array that includes time series data collected by a second sensor. The first data array can be stored proximate to the second data array based on the first and second sensor being in a same sensor group. A query can be received to perform a processing algorithm on a subset of time series data. The subset can be generated by retrieving the first and second data array. The query can be executed by applying the processing algorithm to the subset of time series data. Related methods and articles of manufacture are also provided.

27 Claims, 14 Drawing Sheets

(56) References Cited

U.S. PATENT DOCUMENTS

| | | | |
|---|---|---|---|
| 2014/0046983 A1* | 2/2014 | Galloway | G06Q 30/0201 |
| | | | 707/798 |
| 2014/0122022 A1 | 5/2014 | Chen et al. | |
| 2014/0164611 A1* | 6/2014 | Molettiere | A61B 5/1112 |
| | | | 709/224 |
| 2016/0092484 A1* | 3/2016 | Finkler | G06F 16/2272 |
| | | | 707/715 |
| 2016/0378809 A1* | 12/2016 | Chen | G06F 16/2455 |
| | | | 707/755 |
| 2017/0039232 A1* | 2/2017 | Jayanth | G06F 16/278 |

* cited by examiner

Over-Rating Events

| Transformer ↕ Q | KVA Q | Start Descending ▼ Q | Duration (m) ↕ Q | Max KW ↕ |
|---|---|---|---|---|
| | 15 | September 10th 2016, 23:45:00:000 | 0 | 15.492 |
| | 10 | September 10th 2016, 23:15:00:000 | 15 | 10.27 |
| | 15 | September 10th 2016, 23:00:00:000 | 15 | 15.151 |
| | 25 | September 10th 2016, 23:30:00:000 | 30 | 32.014 |
| | 15 | September 10th 2016, 22:15:00:000 | 15 | 15.202 |
| | 15 | September 10th 2016, 21:45:00:000 | 15 | 16.116 |

Total Minutes Over Rating

| Transformer ↕ Q | KVA ↕ Q | Sum Duration (m) ↕ | Avg Max KW ↕ | Max KW ↕ |
|---|---|---|---|---|
| | 15 | 29.835 | 18.409 | 29.959 |
| | 15 | 25.590 | 18.061 | 27.994 |
| | 25 | 22.785 | 27.328 | 35.813 |
| | 25 | 22.200 | 23.498 | 40.459 |
| | 10 | 22.050 | 12.040 | 19.627 |
| | 10 | 17.940 | 11.976 | 20.611 |
| | 15 | 17.830 | 18.009 | 28.082 |

Export Raw ⇩ Forward ⇩

| 1 | 2 | 3 | 4 | 5 | ...44 | > |

FIG. 4D

```
"trex": [
  {
    "id":   "trex_1",
    "name":   "production",
    "url":   "tcp://localhost:9090",
    "username":   "defaultreader",
    "password":   "password"
  }
],
```

FIG. 6A

```
"elasticsearch":   [
    {
        "id":    "internal",
        "name":   "internal",
        "host":   "localhost",
        "port":   9200,
        "url_prefix" :    " "
    },
    {
        "id":    "es_1",
        "name":  "metadata",
        "host":   "localhost",
        "port":   9200,
        "url_prefix":   " "
    }
],
```

FIG. 6B

```
"query_sets": [
  {
    "id": "qs_2",
    "name": "FCTY Housing Query Set",
    "trex_id": "trex_1",
    "start": "2015-12-09 00 : 00 : 00",
    "end": "2016-03-22 00 : 00 : 00",
    "counts": 1,
    "delay": 0,
    "sampling_rate": 1,
    "sampling_rate_unit": "D",
    "iterators": [
      {
        "type": "consumption_interpolation",
        "start_margin": 300000,
        "stop_margin": 300000,
        "sampling_rate": 60,
        "sampling_rate_unit": "m",
        "calc_field_prefix": "CALC_",
        "additional_sentinels": [ 0 ]
      },
      {
        "type": "calculated_difference",
        "start_margin": 300000,
        "field_names": [ "^CALC_.*$" ],
        "additional_sentinels": [ ]
      }
    ],
    "systems": [
      {
        "name": "^FCTY_HOUSING$",
        "part_of_node_path": true,
        "nodes": [
          {
            "path": "(?=^.*$) (?!(^.*\/INT_.*$))", "fields": [
              {
                "name": "^kWh$"
              }
            ]
          }
        ]
      }
    ]
  }
],
```

```
"iterators": [
    {
        "type":  "consumption_interpolation",
        "start_margin":  300000,
        "stop_margin":  300000,
        "sampling_rate":  60,
        "sampling_rate_unit":  "m",
        "calc_field_prefix":  "CALC_",
        "additional_sentinels":  [ 0 ]
    },
    {
        "type":  "calculated_difference",
        "start_margin":  300000,
        "field_names":  ["^CALC_.*$"],
        "additional_sentinels":  [ ]
    }
],
```

```
"systems": [
    {
        "name":  "^FCTY_HOUSING$",
        "part_of_node_path":  true,
        "nodes": [
            {
                "path":  "(?=^FCTY_HOUSING\/.*$) (?!(^.*\/UNKNOWNS\/.*$))",
                "fields": [
                    {
                        "name":  ".*"
                    }
                ]
            }
        ]
    }
]
```

```
"nodes": [
  {
    "path": "(?=^FCTY_HOUSING\/.*$) (?!(^.*\/UNKNOWNS\/.*$))",
    "fields": [
      {
        "name": ".*"
      }
    ]
  }
]
```

FIG. 6F

```
"output_adapters": [
  {
    "id": "adapter1",
    "type": "trex",
    "connection": "trex_1",
    "output_dir": "output",
    "node_cache_include_regex": "^FCTY_HOUSING\/.*$",
    "node_cache_exclude_regex": ""
  },
  {
    "id": "adapter2",
    "type": "elasticsearch",
    "elasticsearch": "es_1",
    "document_configuration": "dc_1",
  }
],
```

FIG. 6G

```
"document_configuration": [
  {
    "id": "dc_1",
    "name": "Forest City Summary Stats",
    "index": "fcty_housing_stats",
    "index_type": "fcty_housing_stats_type",
    "type_mapping": {
      "nodepath": {"type": "string", "index": "not_analyzed"},
      "field": {"type": "string", "analyzer": "keyword"},
      "sensor": {"type": "string", "analyzer": "keyword"},
      "device_path": {"type": "string", "index": "not_analyzed"},
      "engineering_unit": {"type": "string", "analyzer": "keyword"},
      "datasource": {"type": "string", "analyzer": "keyword"},
      "start": { "type": "date", "analyzer": "keyword" },
      "end": {"type": "date", "analyzer": "keyword" },
      "valid_from": {"type": "date", "analyzer": "keyword" },
      "Feeder": {"type": "string", "analyzer": "keyword"},
      "Substation": {"type": "string", "analyzer": "keyword"},
      "Neighborhood": {"type": "string", "index": "not_analyzed"},
      "Combined Distribution Transformer": {"type": "string", "index": "not_analyzed"},
      "Distribution Transformer (FCTY)": {"type": "string", "index": "not_analyzed"},
      "Distribution Transformer (SCTY)": {"type": "string", "index": "not_analyzed"}
    },
    "unique_id_fields": ["datasource", "device_path", "start", "end"],
    "required_fields": [
      "sensor",
      "datasource",
      "device_path",
      "start",
      "end"
    ]
  }
],
```

```
                                    ← 692
"metadata": [
   {
      "systems": ["FCTY_HOUSING"],
      "trex_id": "trex_1",
      "elasticsearch_id": "es_1",
      "index": "fcty_housing", "index_type": "fcty_housing_type",
      "valid_from_field": "valid_from"
   }
],
```

```
                              ← 694
"internal": [
   "elasticsearch_id": "internal",
   "index": "internal",
   "doc_type": "internal_type",
   "doc_id": "FCTY_HOUSING"
   ]
```

TIME SERIES DATA QUERY ENGINE

RELATED APPLICATIONS

This application claims priority to U.S. Provisional Application No. 62/357,116 entitled PROCESSING TIME SERIES DATA FROM MULTIPLE SENSORS AND TIME SERIES DATA SEARCH ENGINE and filed on Jun. 30, 2016, U.S. Provisional Application No. 62/357,178 entitled DATA HISTORIAN and filed on Jun. 30, 2016, U.S. Provisional Application No. 62/357,193 entitled STORING OF SYSTEM MONITORING DATA FOR RANDOM ACCESS QUERIES and filed on Jun. 30, 2016, and U.S. Provisional Application No. 62/357,210 entitled DATA PARTITIONING AND GROUPING and filed on Jun. 30, 2016, the disclosures of which are incorporated herein by reference in their entirety.

TECHNICAL FIELD

The subject matter disclosed herein relates generally to database processing and more specifically to the processing of time series data.

BACKGROUND

Time series data can refer to one or more sequences of data points collected over a continuous time interval. For example, a multitude of sensors and/or meters may be deployed across a distributed system such as, for example, a power grid, process controller, telecommunications network, computing network, and/or the like. These sensors may be configured to perform a variety of measurements over continuous time intervals, thereby generating time series data. To further illustrate, a power grid can be equipped with sensors configured to perform measurements that include, for example, voltage, current, power, equipment status, sunlight irradiance levels, wind speeds, and/or the like. The resulting time series data can characterize the operation of the power grid. Such time series data can be especially be useful for monitoring, forecasting, and/or controlling the operation of the electric grid.

SUMMARY

Systems, methods, and articles of manufacture, including computer program products, are provided for querying time series data. In some example embodiments, there is provided a system that includes at least one data processor and at least one memory. The at least one memory may store instructions that result in operations when executed by the at least one data processor. The operations may include: receiving time series data collected by a first sensor; storing the time series data collected by the first sensor in a first data array associated with the first sensor, the first data array being stored proximate to a second data array, the second data array including time series data collected by a second sensor, the first data array being stored proximate to the second data array based at least on the first sensor and the second sensor being in a first sensor group; receiving a query to perform a processing algorithm on a subset of time series data; generating the subset of time series data by at least retrieving the first data array and the second data array; and executing the query by at least applying the processing algorithm to the subset of time series data.

In some variations, one or more features disclosed herein including the following features can optionally be included in any feasible combination. The generation of the subset of time series data can include adding the first data array and the second data array to the subset of time series data.

In some variations, the generation of the subset of time series data can include filtering, based on one or more filter criteria, the first data array and the second data array. The one or more filter criteria can exclude the time series data collected by the first sensor. A filtered selection of time series data can be added to the subset of time series data. The filtered selection of time series data can exclude the first data array. The one or more filter criteria In some variations, the generation of the subset of time series data can include grouping, based on one or more grouping criteria, the first data array and the second data array. The one or more grouping criteria can group the first data array and the second data array into a same group and/or different groups. The one or more grouping criteria can include sensor attributes.

In some variations, the first data array and the second data array can be stored at proximate memory addresses and/or proximate disk sectors. The first data array and the second data array can further be stored with a third data array, the third data array including a plurality of timestamps corresponding to the time series data collected by the first sensor and/or the time series data collected by the second sensor. The execution of the query can further include retrieving the third data array.

In some variations, the first data array can be stored proximate to the second data array further based on the first data array and the second data array including time series data that spans a same time period. Time series data spanning a different time period can be included in a second subset of time series data. The second subset of time series data can include a third data array that includes the time series data collected by the first sensor. The second subset of time series data can further include a fourth data array that includes the time series data collected by the second sensor.

In some variations, the first sensor and the second sensor can be configured to perform measurements over a continuous time interval. The first sensor and the second sensor can be configured to perform measurements at a same sampling rate. The first sensor and the second sensor can be included in the first sensor group based at least on the first sensor and the second sensor being located in a same geographic region, being in a same hierarchy level, and/or performing a same type of measurement.

In some variations, time series data collected by a third sensor can be received. The time series data collected by the third sensor can be stored in a third data array associated with the third sensor. The third data array can be stored separately from the first data array and/or the second data array based at least on the third sensor being in a second sensor group.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 4D depicts an output of a query on time series data consistent with implementations of the current subject matter;

FIG. 6A depicts programming code implementing a query configuration consistent with implementations of the current subject matter;

FIG. 6B depicts programming code implementing a query configuration consistent with implementations of the current subject matter;

FIG. 6C depicts programming code implementing a query configuration consistent with implementations of the current subject matter;

FIG. 6D depicts programming code implementing a query configuration consistent with implementations of the current subject matter;

FIG. 6E depicts programming code implementing a query configuration consistent with implementations of the current subject matter;

FIG. 6F depicts programming code implementing a query configuration consistent with implementations of the current subject matter;

FIG. 6G depicts programming code implementing a query configuration consistent with implementations of the current subject matter;

FIG. 6I depicts programming code implementing a query configuration consistent with implementations of the current subject matter;

When practical, similar reference numbers denote similar structures, features, or elements.

DETAILED DESCRIPTION

Sensors can be deployed across a distributed system to perform measurements over a continuous time interval. As noted, the resulting time series data can characterize the operation of the system and can therefore be used to sensor, forecast, and/or control the operation of the system. However, a number of factors including, for example, the quantity of sensors, the length of the time interval, and/or the like, can give rise to an immense volume of time series data that overwhelms conventional techniques for data processing, storage, and access. As such, in some implementations of the current subject matter, time series data can be stored in a manner that enables customized queries to be executed with respect to specific subsets of the time series data.

Figure 1:
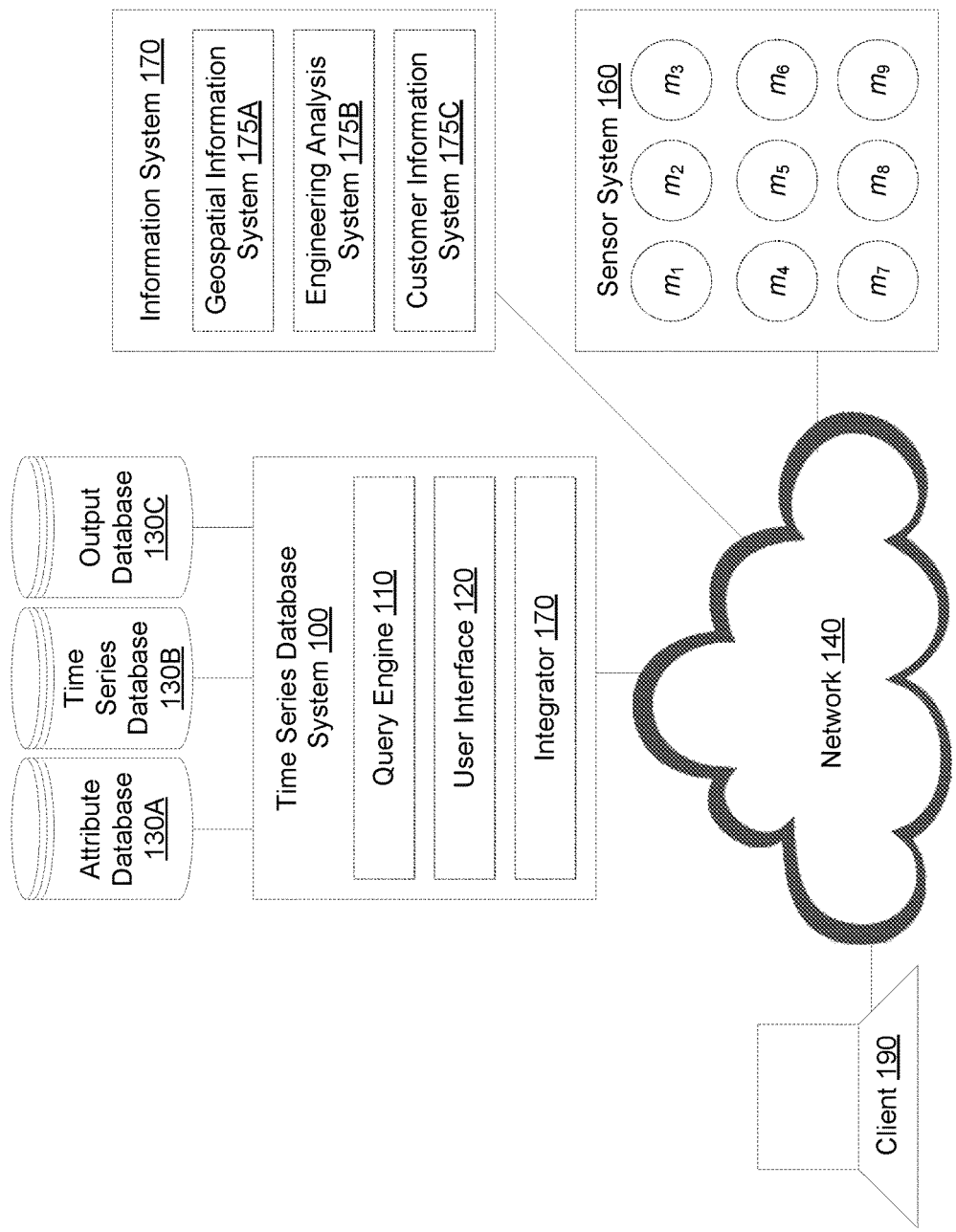
FIG. 1 depicts a system diagram illustrating a time series database system consistent with implementations of the current subject matter.

FIG. 1 depicts a system diagram illustrating a time series database system 100 consistent with implementations of the current subject matter. Referring to FIG. 1, the time series database system 100 can include a query engine 110 and a user interface 120. The query engine 110 can be coupled to a plurality of databases including, for example, an attribute database 130A, a time series database 130B, and/or an output database 130C. Although shown as separate databases, the attribute database 130A, the time series database 130B, and/or the output database 130C may also be part of a single database. Furthermore, the attribute database 130A, the time series database 130B, and/or the output database 130C may be any type of database including, for example, an in-memory database, a relational database, a non-SQL (NoSQL) database, and/or the like.

Referring again to FIG. 1, the time series database system 100 may be communicatively coupled, via a network 140, to a sensor system 160 and/or an information system 170. The network 140 can be any wired and/or wireless network including, for example, a public land mobile network (PLMN), a wide area network (WAN), a local area network (LAN), the Internet, and/or the like. The sensor system 160 can include a plurality of sensors deployed across one or more distributed systems such as, for example, power grids, process controllers, telecommunications networks, computing networks, and/or the like. As used herein, a sensor can refer to any type of monitoring and/or metering device configured to perform measurements over a continuous time interval. One or more of these sensors may be an Internet-of-Things (IoT) device capable of communicating with the time series database system 100 directly via the network 140. It should be appreciated that at least some of the sensors may be configured to perform the measurements in a synchronized manner such as, for example, at a same sampling rate. The resulting time series data can one or more sequences of data points that correspond to the measurements performed by the sensors. This time series data can be collected and stored at the time series database system 100, for example, at the time series database 130B. Each sensor may be associated with a unique sensor identifier that enables a differentiation between time series data collected by different sensors within the sensor system 160.

Meanwhile, the information system 170 can store attribute data tracking a plurality of attributes associated with the sensor system 160. For example, the information system 170 can include a geospatial information system 175A and/or an engineering analysis system 175B configured to store data representative of the locations of the sensors within the sensor system 160. It should be appreciated that the information system 170 can store a plurality of sensor attributes including, for example, meter type, engineering unit, meter configuration (e.g., software version and/or configuration), grid location, spatial location (e.g., longitude and/or latitude), sampling rate, precision, accuracy, and/or the like. When query time series data collected by specific sensors and/or sensor groups, the selection of sensor can be made based on one or more sensor attributes. Alternatively and/or additionally, the selection of one or more specific sensors and/or sensor groups can be made based on the attribute of another grid device. For example, one query can specify time series data collected by a group of sensors located under distribution transformers having a certain capacity (e.g., 10 kilo volt amps (KVA))

The information system 170 can further include a customer information system 175C storing data that links different customers to their respective sensors within the sensor system 160. As used in the context of a power grid, a customer can refer to a consumer of electricity. It should be appreciated that the customer information system 175C can store a plurality of customer attributes including, for example, customer type (e.g., commercial, industrial, residential), reverse power flow capability, rate schedule, participation in utility programs, and/or the like.

It should be appreciated that the time series database system 100 may include an integrator 180 configured to combine time series data from the sensor system 160 with the attribute data from the information system 170. As noted, the time series data from the sensor system 160 can be associated with unique sensor identifiers to differentiate between time series data collected by different sensors within the sensor system 160. Likewise, the attribute data from the information system 170 can also be associated with unique sensor identifiers to differentiate between attribute data for different sensors. Thus, in some implementations of the current subject matter, the time series data and the attribute data can be combined based on the unique sensor identifiers. For instance, the integrator 180 can identify, based on the unique sensor identifiers, time series data and attribute data that are associated with the same sensors.

As shown in FIG. 1, the time series database system 100 can also be communicatively coupled, via the network 140, to one or more clients including, for example, a client 190. The client 190 can send, to the time series database system 100, requests to execute one or more queries with respect to the time series data held at the time series database system 100. For example, the client 190 may request to perform, based on the time series data held at the time series database system 100, voltage analytics, determine power grid system loss, identify overloaded transformers, and/or the like. According to some implementations of the current subject matter, the query can be customized by the client 190. For example, the client 190 can, via the user interface 120, specify the schedule, the data selection, the processing algorithm, and/or the output configuration applicable to the query. The customized query can subsequently be executed, by the query engine 110, on at least a portion of the time series data held at the time series database system 100. For instance, the query engine 110 can execute the query by at least performing the specified processing algorithm on a particular subset of time series data in accordance with the schedule indicated by the client 190. Furthermore, the query engine 110 can generate a corresponding output that is consistent with the output configuration specified by the client 190.

Figure 2:
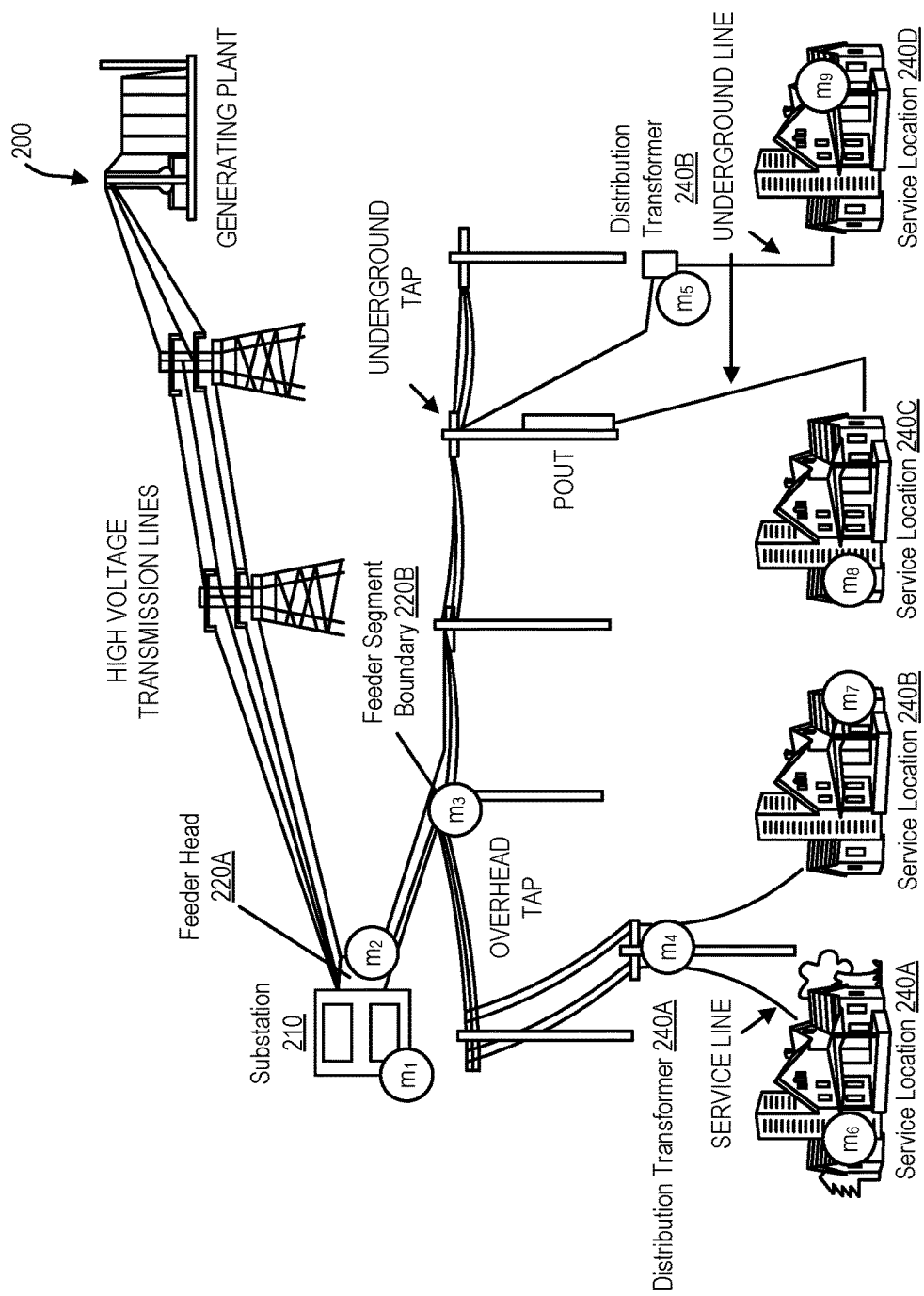
FIG. 2 depicts a system diagram illustrating a sensor system consistent with implementations of the current subject matter.

FIG. 2 depicts a system diagram illustrating the sensor system 160 consistent with some implementations of the current subject matter. Referring to FIG. 2, the sensor system 160 can include a plurality of sensors including, for example, a first sensor $m_1$, a second sensor $m_2$, a third sensor $m_3$, a fourth sensor $m_4$, a fifth sensor $m_5$, a sixth sensor $m_6$, a seventh sensor $m_7$, an eighth sensor $m_8$, and/or a ninth sensor $m_9$. The first sensor $m_1$, the second sensor $m_2$, the third sensor $m_3$, the fourth sensor $m_4$, the fifth sensor $m_5$, the sixth sensor $m_6$, the seventh sensor $m_7$, the eighth sensor $m_8$, and/or the ninth sensor $m_9$ can be deployed across a distributed system 200. As noted, the first sensor $m_1$, the second sensor $m_2$, the third sensor $m_3$, the fourth sensor $m_4$, the fifth sensor $m_5$, the sixth sensor $m_6$, the seventh sensor $m_7$, the eighth sensor $m_8$, and/or the ninth sensor $m_9$ can be configured to perform measurements over a continuous time interval. One or more of these sensors can further be configured to perform the measurements in a synchronized manner such as, for example, at a same sampling rate.

To further illustrate, FIG. 2 depicts the distributed system 200 as a power grid. However, it should be appreciated that the distributed system 200 can be any type of distributed system including, for example, a process controller, a telecommunications network, a computing network, and/or the like. As shown in FIG. 2, the distributed system 200 can include a substation 210, a feeder head 220A, a feeder segment boundary 220B, a first distribution transformer 230A, a second distribution transformer 230B, a first service location 240A, a second service location 240B, a third service location 240C, and/or a fourth service location 240D. The substation 210, the feeder head 220A, the feeder segment boundary 220B, the first distribution transformer 230A, the second distribution transformer 230B, the first service location 240A, the second service location 240B, the third service location 240C, and/or the fourth service location 240D can form a hierarchy.

At least one sensor from the sensor system 160 can be deployed at each of the substation 210, the feeder head 220A, the feeder segment boundary 220B, the first distribution transformer 230A, the second distribution transformer 230B, the first service location 240A, the second service location 240B, the third service location 240C, and/or the fourth service location 240D. For example, as shown in FIG. 2, the first sensor $m_1$ can be deployed at the substation 210, the second sensor $m_2$ can be deployed at the feeder head 220A, the third sensor $m_3$ can be deployed at the feeder segment boundary 220B, the fourth sensor $m_4$ can be deployed at the first distribution transformer 240A, the fifth sensor $m_5$ can be deployed at the second distribution transformer 240B, the sixth sensor $m_6$ can be deployed at the first service location 240A, the seventh sensor $m_7$ can be deployed at the second service location 240B, the eighth sensor $m_8$ can be deployed at the third service location 240C, and the ninth sensor $m_9$ can be deployed at the fourth service location 240D.

In some implementations of the current subject matter, the first sensor $m_1$, the second sensor $m_2$, the third sensor $m_3$, the fourth sensor $m_4$, the fifth sensor $m_5$, the sixth sensor $m_6$, the seventh sensor $m_7$, the eighth sensor $m_8$, and/or the ninth sensor $m_9$ can be configured to perform, over a continuous time period, one or more measurements including, for example, voltage, current, power, equipment status, sunlight irradiation levels, wind speeds, and/or the like. One or more subsets of the first sensor $m_1$, the second sensor $m_2$, the third sensor $m_3$, the fourth sensor $m_4$, the fifth sensor $m_5$, the sixth sensor $m_6$, the seventh sensor $m_7$, the eighth sensor $m_8$, and/or the ninth sensor $m_9$ can be configured to perform the measurements in a synchronized manner (e.g., at a same sampling rate). For example, sensors located in the same geographic region may perform measurements at a same sampling rate (e.g., every 15 minutes). The resulting time series data can be stored at the time series database system 100, for example, in the time series database 130B.

In some implementations of the current subject matter, each of the first sensor $m_1$ the second sensor $m_2$, the third sensor $m_3$, the fourth sensor $m_4$, the fifth sensor $m_5$, the sixth sensor $m_6$, the seventh sensor $m_7$, the eighth sensor $m_8$, and/or the ninth sensor $m_9$ may be associated with one or more attributes including, for example, geographical location, delivery voltage, hierarchical position (e.g., transformer level, segment level, feeder level, substation level), rate schedule, service location type, and/or the like. As noted, the time series database system 100 can collect at least some of this attribute data from the information system 170. Furthermore, this attribute data can further be combined with time series data from the sensor system 160 before being stored at the time series database system 100, for example, in the attribute database 130A.

The time series database system 100 can be configured to store time series data in a manner that enables efficient retrieval of specific subsets of the time series data including, for example, time series data generated by specific groups of sensors from the sensor system 160 and/or time series data that span across a specific period time. In some implementations of the current subject matter, the time series data can be stored in a manner that exploits the spatial and/or temporal locality present in the time series data. For example, time series data generated by sensors performing the same types of measurements and/or are located in the same region can be stored together at the times series database 130B, for example, in proximate memory addresses, disk sectors, and/or the like. Alternatively and/or additionally, consecutive values of data from a same time span can also be stored together at the time series database 130B, for example, in proximate memory addresses, disk sectors, and/or the like. As used herein, proximate memory addresses and/or disk sectors can be adjacent, adjoining, neighboring, sequential, contiguous, and/or the like. It should be appreciated that consecutive values from the same sensor can include redundant information. Thus, time series data from the sensor system 160 can be compressed prior to being stored in the time series database 130B.

In some example embodiments, the time series data stored at the time series database 130B can be grouped based on the sensors that generated the time series data. For example, the first sensor $m_1$, the second sensor $m_2$, the third sensor $m_3$, the fourth sensor $m_4$, the fifth sensor $m_5$, the sixth sensor $m_6$, the seventh sensor $m_7$, the eighth sensor $m_8$, and/or the ninth sensor $m_9$ from the sensor system 160 can be divided in to groups based on the geographic region in which each sensor is located, the hierarchy level of the sensor (e.g., transformer level, segment level, feeder level, substation level), and/or the type of measurement performed by the sensor. As such, time series data generated by sensors located in the same region and/or performing the same types of measurements (e.g., voltage, current, power, equipment status, sunlight irradiance levels, wind speeds, and/or the like) may be stored together in the time series database 130B, for example, in proximate memory spaces, disk sectors, and/or the like. Alternatively and/or additionally, the time series data stored at the time series database 130B can further be grouped based on time. For instance, time series data from one sensor can be divided into a plurality of one-dimensional data arrays. Each of the plurality of one-dimensional data arrays can store time series data spanning a certain time period.

Figure 3A:
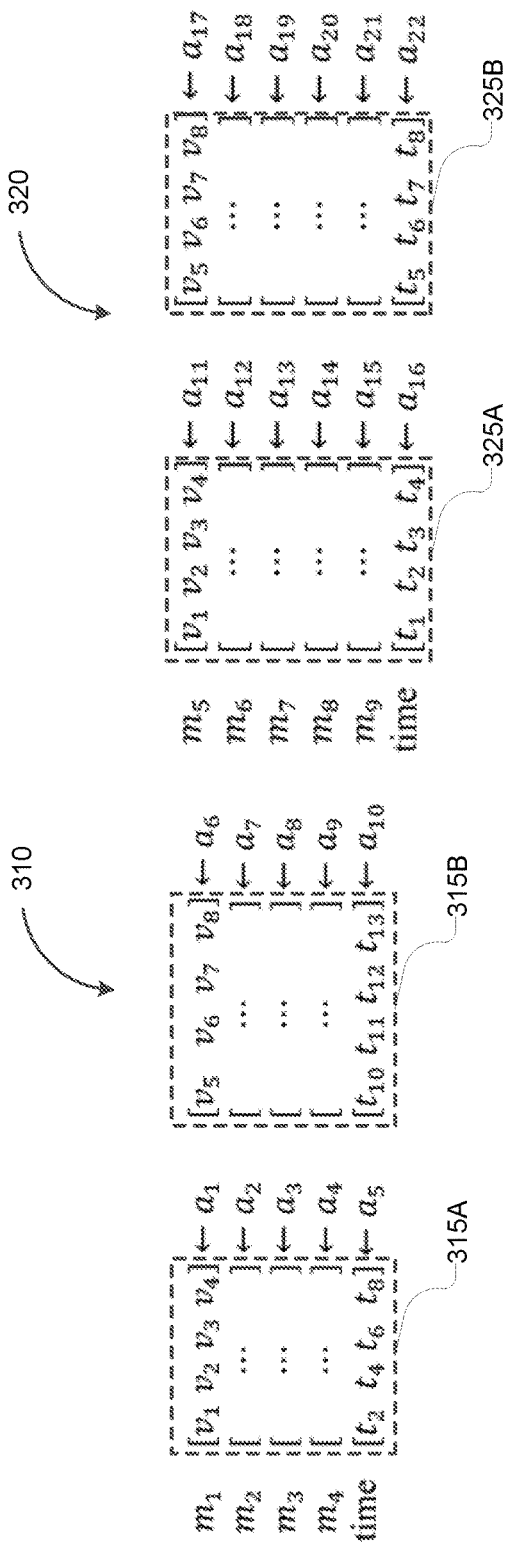
FIG. 3A depicts a first sensor group and a second sensor group consistent with implementations of the current subject matter.

To further illustrate, FIG. 3A depicts a first sensor group 310 and a second sensor group 320 consistent with some implementations of the current subject matter. In some implementations of the current subject matter, time series data from the sensor system 160 can be grouped based on the sensors that generated the time series data. Here, the sensors from the sensor system 160 can be separated into the first sensor group 310 and the second sensor group 320 based on the geographic location of the sensors, the hierarchy level of the sensors, and/or the type of measurements performed by the sensors. As shown in FIG. 3A, the first sensor group 310 can include the first sensor $m_1$, the second sensor $m_2$, the third sensor $m_3$, and the fourth sensor $m_4$ while the second sensor group 320 can include the fifth sensor $m_5$, the sixth sensor $m_6$, the seventh sensor $m_7$, the eighth sensor $m_8$, and the ninth sensor $m_9$. The first sensor the second sensor $m_2$, the third sensor $m_3$, and the fourth sensor $m_4$ can all be located in one geographic region while the second sensor group 320 can include the fifth sensor $m_5$, the sixth sensor $m_6$, the seventh sensor $m_7$, the eighth sensor $m_8$, and the ninth sensor $m_9$ can all be located within a different geographic region. Alternatively and/or additionally, the first sensor $m_1$ the second sensor $m_2$, the third sensor $m_3$, and the fourth sensor $m_4$ can all perform one type of measurement (e.g., voltage) while the second sensor group 320 can include the fifth sensor $m_5$, the sixth sensor $m_6$, the seventh sensor $m_7$, the eighth sensor $m_8$, and the ninth sensor $m_9$ can all perform a different type of measurement (e.g., sunlight irradiation levels).

The sensors in the same sensor group (e.g., the first sensor group 310 and/or the second sensor group 320) can perform measurements in a synchronized manner. For example, as shown in FIG. 3A, the first sensor $m_1$, the second sensor $m_2$, the third sensor $m_3$, and the fourth sensor $m_4$ can all perform measurements at the same sampling rate. Likewise, the fifth sensor $m_5$, the sixth sensor $m_6$, the seventh sensor $m_7$, the eighth sensor $m_8$, and the ninth sensor $m_9$ can also perform measurements at the same sampling rate. However, it should be appreciated that sensors belonging to different sensor groups do not necessarily perform measurements in a synchronized manner. For instance, as shown in FIG. 3A, the sensors in the first sensor group 310 can perform measurements at a different sampling rate than the sensors in the second sensor group 320.

Referring again to FIG. 3A, the time series data from the sensor group 160 can further be grouped based on time. For example, the time series data collected by each sensor in the sensor group 160 can be further divided into a plurality of one-dimensional data arrays storing time series data that span a specific time period. One or more one-dimensional data arrays containing time series data can be stored with an additional one-dimensional data array that contains the corresponding timestamps. To further illustrate, as shown in FIG. 3A, time series data collected by the first sensor $m_1$, the second sensor $m_2$, the third sensor $m_3$, and the fourth sensor $m_4$ can be divided into a plurality of one-dimensional data arrays including, for example, the arrays $a_1$ through $a_4$ and the arrays $a_6$ through $a_9$. Time series data collected between time $t_2$ through time $t_9$ can be held in the arrays $a_1$ through $a_4$. Furthermore, the arrays $a_1$ through $a_4$ can be stored with an array $a_5$, which holds the corresponding timestamps for the time series data in the arrays $a_1$ through $a_4$. The arrays $a_1$ through $a_5$ can form a first subset 315A of time series data. Alternatively and/or additionally, time series data collected by the first sensor $m_1$, the second sensor $m_2$, the third sensor $m_3$, and the fourth sensor $m_4$ from time $t_{10}$ through time $t_{14}$ can be held in the arrays $a_6$ through $a_9$. The arrays $a_6$ through $a_9$ can be stored with an array $a_{10}$ that holds the corresponding timestamps for the time series data in the arrays $a_6$ through $a_9$. The arrays $a_6$ through $a_{10}$ can form a second subset 315B of time series data.

Meanwhile, time series data collected by the fifth sensor $m_1$, the sixth sensor $m_6$, the seventh sensor $m_7$, the eight sensor $m_8$, and the ninth sensor $m_9$ can also be divided into a plurality of one-dimensional data arrays including, for example, the arrays $a_{11}$ through $a_{15}$ and the arrays $a_{17}$ through $a_{21}$. Time series data collected by these sensors between time $t_1$ and time $t_5$ can be held in the arrays $a_{11}$ through $a_{15}$ while time series data collected by these sensors between time $t_5$ and time $t_9$ can be held in the arrays $a_{17}$ through $a_{21}$. The arrays $a_{11}$ through $a_{15}$ can be stored with an array $a_{16}$, which holds the timestamps for the time series data held in the arrays $a_{11}$ through $a_{15}$. The arrays $a_{11}$ through $a_{16}$ can form a third subset 325A of time series data. Likewise, the arrays $a_{17}$ through $a_{21}$ can also be stored with an array $a_{22}$, which holds timestamps for the time series data held in the arrays $a_{17}$ through $a_{21}$. The arrays $a_{17}$ through $a_{22}$ can form a fourth subset of time series data 325B. It should be appreciated that the first subset 315A, the second subset 315B, the third subset 325A, and/or the fourth subset 325B of time series data can be retrieved from the time series database system 100 in order to execute a query from the client 190. The size of these one-dimensional data arrays $a_1$ through $a_{22}$ can be configured based on a quantity of data that is retrieved by a typical query to the time series database system 100.

Figure 3B:
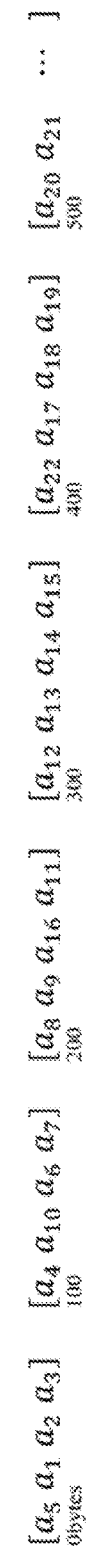
FIG. 3B depicts a log file consistent with implementations of the current subject matter.
Figure 4A:
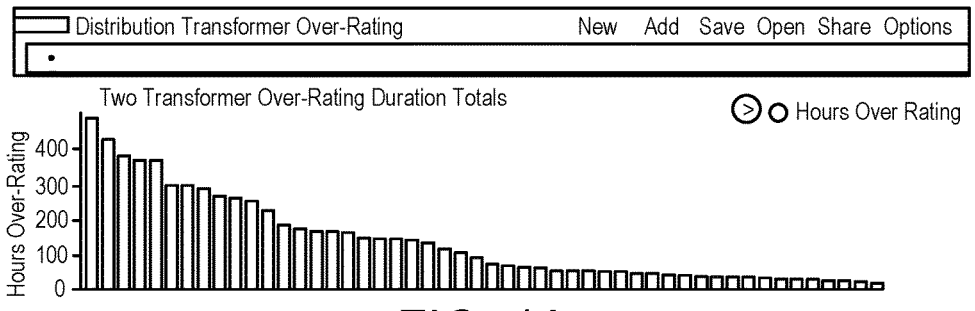
FIG. 4A depicts an output of a query on time series data consistent with implementations of the current subject matter.
Figure 4B:
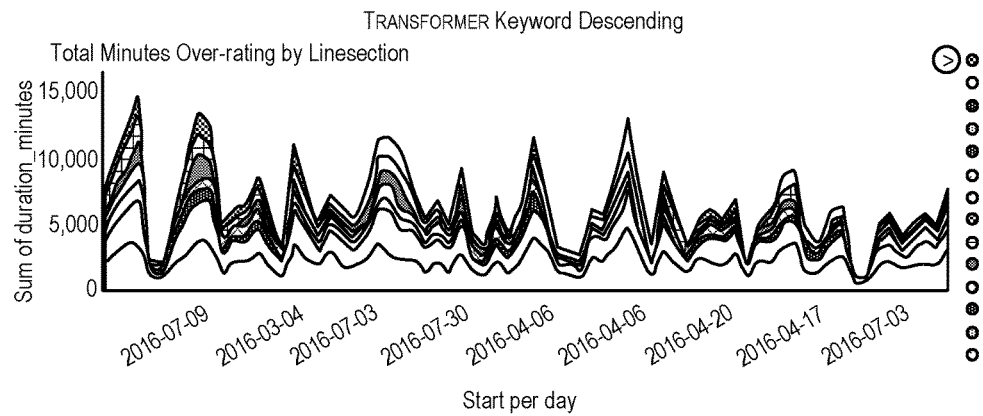
FIG. 4B depicts an output of a query on time series data consistent with implementations of the current subject matter.
Figure 4C:
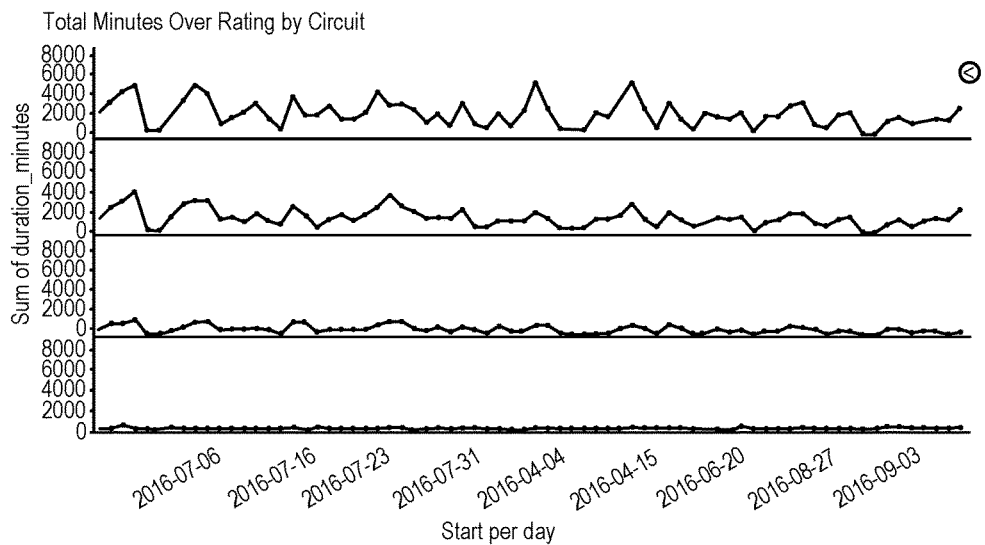
FIG. 4C depicts an output of a query on time series data consistent with implementations of the current subject matter.

FIG. 3B depicts a physical log file 330 consistent with implementations of the current subject matter. In some example embodiments, the time series data stored at the time series database 130B can be held in the physical log file 330. The physical log file 330 can include one or more ranges of memory addresses on any type of persistence. As shown in FIG. 3B, the one-dimensional data arrays holding time series data and the corresponding timestamps (e.g., the arrays $a_1$ through $a_{22}$) can be written to different offsets within the physical log file 330. Furthermore, one-dimensional arrays from the same subset of time series data can be stored in a continuous block within the physical log file 330.

In some implementations of the current subject matter, the client 190 can query the time series database system 100 by specifying one or more criteria including, for example, a name of a sensor group, a time range, and/or a subset of sensors within a sensor group. The query engine 110 can respond to the query from the client 190 by iteratively retrieving, from the time series database 130B, one or more arrays of data that include values matching the criteria of the query. The retrieved time series data can be ordered by time and delivered to the client 190 via the user interface 120.

It should be appreciated that depending on how time series data is loaded into the time series database system 100, the one-dimensional arrays containing time series data can be stored in multiple physical log files such as, for example, the physical log file 330. Furthermore, two or more one-dimensional data arrays may contain overlapping, conflicting, and/or duplicate data. However, the time series database system 100 can be configured to conceal the complexity of time series data from users such as client 190. For example, the time series database system 100 can maintain an index of all of the one-dimensional data arrays held at the time series database system 100, for example, in the time series database 130B. As such, from the perspective of users such as the client 190, the time series database system 110 is storing continuous streams of time series data as recorded by different sensor groups.

As noted, in some implementations of the current subject matter, the time series database system 100 can support customized queries with respect to the time series data held in the time series database 130B. For example, the client 190 can create, via the user interface 120, a query that executes a certain processing algorithm on a specific subset of time series data in accordance with a particular schedule. It should be appreciated that the subset of time series data can include time series data that is generated by a certain group of sensors (e.g., the first sensor group 310 and/or the second sensor group 320) and/or spans a specific time period. Meanwhile, the processing algorithm can include, for example, voltage analytics, system loss determination, overloaded transformer identification, and/or the like. The schedule for performing the specified processing algorithm can include, for example, a one-time execution, specific execution times, periodic execution times, and/or the like.

According to some implementations of the current subject matter, the time series database system 100 can support any form of data selection from the time series database 130B including filtering and/or grouping query results based on shared sensor attribute values. For example, the query can specify a data selection that is consistent with the manner in which time series data are stored at the time series database 130B. Here, the query engine 110 can respond to the query based on the existing groupings of time series data within the time series database 130 without any further processing. That is, the query engine 110 can respond to the query by retrieving, from the time series database 130, one or more subsets of time series data, which are already grouped as shown in FIG. 3A. Alternatively and/or additionally, the query may specify a data selection that requires a filtered subset and/or differently grouped time series data, in which case the query engine 110 can respond to the query by retrieving the one or more subsets of time series data from the time series database 130 that exclude a subset of sensors from the results based on a sensor attribute filter criteria and/or grouping them based on a sensor attribute grouping criteria. Filter criteria can exclude time series data collected by sensors that do not meet one or more filter criteria such as, for example, customer type, distribution transformer connectivity, substation connectivity, circuit connectivity, spatial region, customer rate, customer expected and/or nominal voltage, demand response program participation, and/or the like. Grouping criteria can create groups of sensors that have shared attribute values such as, for example, sharing one or more of the same customer type, distribution transformer connectivity, circuit connectivity, substation connectivity, spatial region, customer rate, customer expected and/or nominal voltage, demand response program participation, and/or the like.

To further illustrate, the query engine 110 can generate one or more query-time groupings responsive to a query by applying one or more filter criteria to identify which sensors are to be included in the response to the query. The query engine 110 can iterate over the time series data in the time series database 130B incrementally over a plurality of time intervals. For instance, the query engine 110 can retrieve, from the time series database system 130B, the existing subsets of time series data such as, for example, the first subset 315A, the second subset 315B, the third subset 325A, and/or the fourth subset 325B. Due to differences in sampling rate between sensors, query engine 110 can further resample and/or interpolate the time series data from each sensor. The resulting resampled and/or interpolated time series data can be regrouped into two-dimensional rectangular matrices based on the query-time groupings, which can be determined based on the attribute specified by the query. The query engine 110 can apply, to these query-time groupings of time series data, the processing algorithm specified by the query.

Table 1 below depicts examples of processing algorithms that can be performed with respect to time series data generated by the sensor system 160 with respect to a power grid. However, it should be appreciated that the client 190 can specify different and/or additional processing algorithms that can be applied to time series data from other distributed systems such as, for example, process controllers, telecommunications networks, computing networks, and/or the like.

customized to include different types of graphical displays such as, for example, tables, line graphs, bar graphs, heat map, and/or the like.

Figure 5:
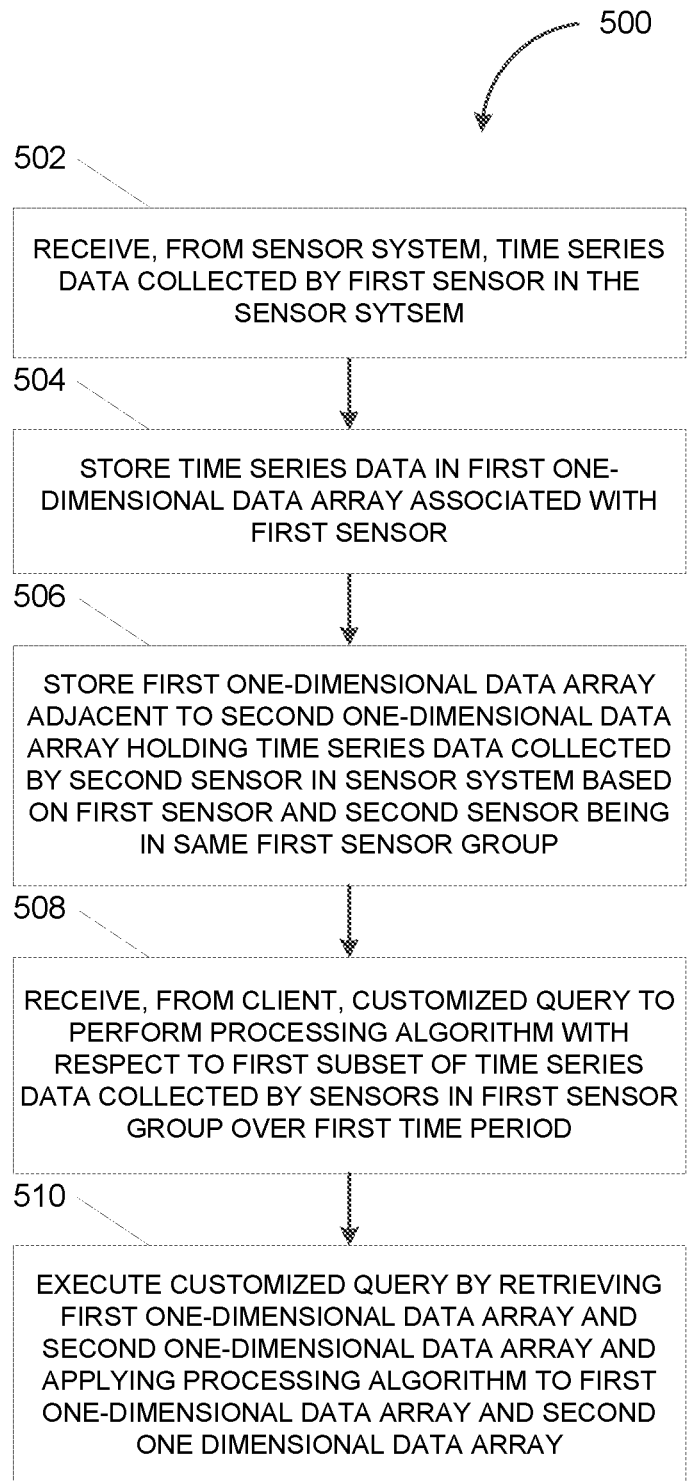
FIG. 5 depicts a flowchart illustrating a process for querying time series data consistent with implementations of the current subject matter.

FIG. 5 depicts a flowchart illustrating a process 500 for querying time series data consistent with implementations of the current subject matter. Referring to FIGS. 1-5, the process 500 can be performed by the time series database system 100.

The time series database system 100 can receive, from the sensor system 160, time series data collected by a first sensor in the sensor system 160 (502). For example, the time series database system 100 can receive time series data from a plurality of sensors in the sensor system 160 including, for example, the first sensor $m_1$, the second sensor $m_2$, the third sensor $m_3$, the fourth sensor $m_4$, the fifth sensor $m_5$, the sixth sensor $m_6$, the seventh sensor $m_7$, the eighth sensor $m_8$, and/or the ninth sensor $m_9$ can be deployed across a distributed system 200. As noted, the sensor system 160 can be deployed across the distributed system 200 which can be, for example, a power grid, a process controller, a telecommunications network, a computing network, and/or the like. The first sensor $m_1$, the second sensor $m_2$, the third sensor $m_3$, the fourth sensor $m_4$, the fifth sensor $m_5$, the sixth sensor $m_6$, the seventh sensor $m_7$, the eighth sensor $m_8$, and/or the ninth sensor $m_9$ cam be configured to perform measurements in a synchronized manner over a continuous time interval, thereby generating the time series data that is received at the time series database system 100.

The time series database system 100 can store the time series data in a first one-dimensional data array associated with the first sensor (504). In some implementations of the current subject matter, the time series database system 100 can store time series data based on time. As such, time series data from different sensors in the sensor system 160 can be stored in separate one-dimensional data arrays. Each one-dimensional data array can store time series data collected by one sensor over a certain time period. For example, as shown in FIGS. 3A-C, the array $a_1$ can store time series data collected by the first sensor $m_1$ between time $t_2$ and time $t_8$ while the array $a_2$ can store time series data collected by the

TABLE 2

Examples of processing algorithms.

| Processing Algorithm | Description |
| --- | --- |
| Voltage Analytics | Processing algorithms for voltage analytics can include algorithms for computing voltage statistics for one of more segments of a power grid, identifying meters having excessive voltage, identifying meters, segments, and/or feeders having the most severe voltage problems, and/or the like. |
| System Loss Determination | Processing algorithms for system loss determination can include algorithms for calculating energy in and/or out of each segment, feeder, and/or segment of a power grid, trending system loss values over time, and/or the like. |
| Overloaded Transformer Identification | Processing algorithms for overloaded transformer identification can include algorithms for summing customer loads under each distribution transformation, comparing transformer ratings, identifying most overloaded transformers, trending overloads over time, and/or the like. |

In some implementations of the current subject matter, the client 190 can further customize the output of the query such that the resulting data, which may be stored to the output database 130C, has certain configurations including, for example, formatting and/or the like. To further illustrate, FIGS. 4A-D depict an output of a query on time series data consistent with implementations of the current subject matter. As shown in FIG. 4A-D, the output of the query can be first sensor $m_1$ between time $t_{10}$ and time $t_{16}$. Alternatively and/or additionally, the array $a_9$ can store time series data collected by the fifth sensor $m_5$ between time $t_1$ and time $t_4$ while the array $a_{10}$ can store time series data collected by the fifth sensor $m_5$ between time $t_5$ and time $t_8$.

The time series database system 100 can store the first one-dimensional data array proximate to a second one-dimensional data array holding time series data collected by a second sensor in the sensor system 160 based at least on the first sensor and the second sensor being in the same first sensor group (506). In some implementations of the current subject matter, the time series database system 100 can store time series data based on groupings of sensors. As noted, sensors in the sensor system 160 can be grouped based on the type of measurements being performed by the sensors, the hierarchy level of the sensor, and/or the geographic locations of the sensors. Thus, one-dimensional arrays of time series data spanning the same time period and collected by sensors within the same sensor group can be stored together, for example, at proximate memory addresses, disk sectors, and/or the like.

The time series database system 100 can receive, from the client 190, a customized query to perform a processing algorithm with respect to a subset of time series data collected by sensors in the first sensor group over a first time period (508). In some implementations of the current subject matter, the time series database system 100 can be configured to support customized queries. For example, the client 190 can customize a query by at least specifying, via the user interface 120, the schedule, the data selection, the processing algorithm, and/or output configuration of the query. As noted, the data selection can include time series data generated by a certain group of sensors within the sensor system 160 over a specific time period. The processing algorithm can include, for example, voltage analytics, system loss determination, overloaded transformer identification, and/or the like. The schedule for performing the specified processing algorithm can include, for example, a one-time execution, specific execution times, periodic execution times, and/or the like.

The time series database system 100 can execute the customized query by at least retrieving the first one dimensional data array and the second one-dimensional data array, and applying the processing algorithm to the first one-dimensional data array and the second one-dimensional data array (510). For example, the time series database system 100 can execute the customized query by retrieving the relevant time series data from the time series database 130B. As noted, the time series database system 100 can store time series data in a manner that enables an efficient retrieval of specific subsets of time series data such as, for example, time series data generated by sensors in a certain group of sensors over a specific time period. Thus, the time series database system 100 can execute a customized query that requires performing a processing algorithm on a specific subset of time series data by at least retrieving the corresponding one-dimensional data arrays. For instance, the query can require performing a processing algorithm such as voltage analytics, system loss determination, and/or overloaded transformer identification time series data collected by sensors in the first sensor group 310 between the $t_2$ and time $t_8$. The time series database system 100 can execute this query by at least retrieving the relevant time series data, which can be held in the arrays $a_1$, $a_2$, $a_3$, and/or $a_4$.

FIG. 6A depicts programming code 610 for implementing a query configuration consistent with implementations of the current subject matter. Referring to FIG. 6A, the client 190 can input, via the user interface 120, the programming code 610 in order to initiate an authenticated communication session with the time series database system 100. Initiating the authenticated communication session enables the client 190 to subsequently access at least a portion of the time series data held by the time series database system 100, for example, in the time series database 130B. Table 2 below provides a description of the parameters included the programming code 610.

TABLE 2

| Field | Type | Description |
| --- | --- | --- |
| id | String | The unique identifier for the configuration item |
| name | String | A display name for the configuration item |
| url | String | The T-REX url including the port, (e.g. tcp://localhost:9090) |
| username | String | The user name to use for T-REX access. Note that if data is being written to T-REX that the user must have the writer role. |
| password | String | The password to use for T-REX access |

FIG. 6B depicts programming code 620 for implementing a query configuration consistent with implementations of the current subject matter. Referring to FIG. 620, the client 190 can input, via the user interface 120, the programming code 620 in order to define a specific customized query. Table 3 below provides a description of the parameters included in the programming code 620.

TABLE 3

| Field | Type | Description |
| --- | --- | --- |
| id | String | The unique identifier for the configuration item |
| name | String | A display name for the configuration item |
| host | String | The Elasticsearch host name (e.g. localhost) |
| port | Integer | The Elasticsearch port number (e.g. 9200) |
| url_prefix | String | The Elasticsearch URL prefix |

FIG. 6C depicts programming code 630 for implementing a query configuration consistent with implementations of the current subject matter. Referring to FIG. 6C, the client 190 can input, via the user interface 120, the programming code 630 in order to specify the schedule for executing a customized query. Table 4 below provides a description of the parameters in the programming code 630.

TABLE 4

| Field | Type | Description |
| --- | --- | --- |
| id | String | The unique identifier for the configuration item |
| name | String | A display name for the configuration item |
| trex_id | String | Specifies the id of the T-REX configuration to use for the query |
| start | String | Inclusive start time for the query. Specified with the format yyyy-MM-dd hh:mm:ss (e.g. 2015-12-11 00:00:00). If not specified counts is used from a specified end or the system time if end is not set. |
| end | String | Exclusive end time for the query. Specified with the format yyyy-MM-dd hh:mm:ss (e.g. 2015-12-13 00:00:00). If not specified the system time is used |

TABLE 4-continued

| Field | Type | Description |
|---|---|---|
| counts | Integer | The number of sampling rate units to use to determine the start time of the query (e.g. counts 2 with sampling_rate 2 and sampling_rate_unit "D" will set start to the beginning of the day before the current day). Only used if start is not set. |
| delay | Integer | The offset to use for the specified query time range. Useful when querying real time data to avoid a race condition that can occur when writing and querying for the same data at the same time. Typically data writes aren't available for query for 1-2 seconds. |
| sampling_rate | Integer | The multiple of sampling_rate_unit to use for the intervals to query data by. |
| sampling_rate_unit | String | The date or time unit to use for the intervals to query data by. Supported values are Y, M, W, D, h, m, s, ms. Date units Y, M, W, D are logically bounded to the beginning of the day. Moreover month, week and day units are bounded (e.g mid month to mid month is not supported) |
| iterators | Array | Optional array of iterator configuration item (see iterators section). This item identifies the iterator transforms to apply to the queried data. |
| systems | Array | Array of system configuration items (see systems section). This item identifies the systems, nodes, and fields to query |

In some implementations of the current subject matter, the query can be customized to run the processing algorithm in a real time mode and/or a historical mode. Real time mode can be enabled by specifying an empty (e.g., NULL value) start time and an empty (e.g., NULL value) end time. When the time series database system 100 executes a query in real time mode, the time series database system 100 can apply the current system time as well as the counts, the sampling rate, the sampling rate unit, the stored last interval in the internal document, and the optional stored start and end times to determine a start time for running the processing algorithm. As such, the time series database 100 can run the processing algorithm at an earliest possible time given these constraints. The last processed interval can always be reprocessed to minimize the possibility of data gaps in the interval. If a "delay" parameter is used to offset the start time from a time boundary associated with the sampling rate unit, the time series database system 100 can impose an additional interval to the start time. Here, the end time can be adjusted to the exclusive end of the interval while the start time can be adjusted to the start of the interval after applying the delay to the time range.

To further illustrate, the time series database system 100 can schedule to run a processing algorithm one minute after midnight with no delay in order to process time series data collected during the previous hour. Here, the end time can be adjusted to 1 AM while the start time can be adjusted to 11 PM of the previous day. The resulting intervals can include the interval before and the interval after midnight. Alternatively and/or additionally, the time series database system 100 can schedule to run a processing algorithm at midnight with a delay of one hour and one minute in order to process time series data collected during the previous hour. In this scenario, the end time can be adjusted to 1 AM while the start time can be set to 11 PM. It should be appreciated that the delay can offset the entire range to span 9:59 PM and 11:59 PM, thereby necessitating the adjustment of the start time 9 AM. The intervals to process can include three separate time intervals between 9 AM and 11:59 PM.

Alternatively and/or additionally, the time series database system 100 can be configured to execute a query in a historical mode, when the query specifies a start time and/or an end time. Where the query does not specify a start time, the end time, counts, sampling rate, and sampling rate unit parameters can be used to determine the start time for running the processing algorithm. If the end time is not specified, the time series database system 100 can apply the current system time.

FIG. 6D depicts programming code 640 for implementing a query configuration consistent with implementations of the current subject matter. Referring to FIG. 6D, the client 190 can input, via the user interface 120, the programming code 640 in order to configure an iterator for transforming time series data retrieved from the time series database 130B. The iterator can apply one or more transformations to the time series data including, for example, interpolation, consumption interpolation, difference, calculated difference, and/or the like. Table 5 below provides a description for the different transformations that can be applied to time series data.

TABLE 5

| Iterator Transform | Description |
|---|---|
| interpolation | Interpolates the queried data by interval for the supplied timestep configuration. Interpolates and returns only the identified fields (defaults to all fields). The field data type must be numeric. Always returns fields with the double data type. Returns an additional field per interpolated field indicating if the value is raw or calculated for each timestep. |

TABLE 5-continued

| Iterator Transform | Description |
| --- | --- |
| consumption_interpolation | Same as the interpolation transform iterator with reset handling |
| difference | Computes the difference of adjacent data points for all fields within the queried data. First data point is ignored. |
| calculated_difference | Same as the difference transform iterator with the ability to apply a boolean diff for configured field names. |

In some implementations of the current subject matter, the iterator can perform interpolation on a stream of time series data retrieved from the time series database 130B. The interpolation time steps can be calculated using the configured transform sampling rate and the sampling rate unit set forth in the programming code 640. Margins can be used to extend the query time range to allow for first data point and/or last data point interpolation. Here, the iterator can returns only the configured fields along with an additional field for each field using the configured calc_fieldprefix to identify if a field value at a particular time step is raw or calculated. Returned fields can have the double data type. Table 6 below depicts sentinel data that is replaced with a Not a Number (NaN) floating point value in order to avoid skewing the interpolation results. It should be appreciated that NaN floating point values can replace gaps in time series data where a sensor fails to record a value. Furthermore, additional sentinels can be configured if necessary.

TABLE 6

| Data type | Min | Max |
| --- | --- | --- |
| int8 | −128 | 127 |
| int16 | −32768 | 32767 |
| int32 | −2147483648 | 2147483647 |
| int64 | −9223372036854775808 | 9223372036854775807 |

Table 7 below provides a description of the parameters for configuring an iterator configured to perform an interpolation of the time series data.

TABLE 7

| Field | Type | Description |
| --- | --- | --- |
| type | String | The iterator transform type, Set to interpolation. |
| start_margin | Integer | The margin before the specified query start to use for interpolating the first configured timestep |
| stop_margin | Integer | The margin before the specified query end to use for interpolating the last configured timestep |
| sampling_rate | Integer | The multiple of sampling_rate_unit to use for the intervals to interpolate for. |
| sampling_rate_unit | String | The date or time unit to use for the intervals to interpolate for. Supported values are Y, M, W, D, h, m, s, ms. |
| calc_field_prefix | String | The prefix to use for the calculated fields. The interpolated field name is used as the suffix |
| additional_sentinels | Array | The array of additional sentinels to ignored |

In some implementations of the current subject matter, the iterator can be configured to perform consumption interpolation on time series data from the time series database 130. The consumption interpolation iterator transform adds reset handling to the interpolation iterator transform. Consumption data increases overtime unless a reset occurs (e.g. meter swapped out, exception sentinels used in data, etc.). Thus, this iterator does not interpolate over the reset boundaries. According to some implementations of the current subject matter, outage values and exceptional values can be added to the array of additional sentinels in order to avoid interpreting these values as resets. The parameters for configuring a consumption interpolation iterator can be the same as those for configuring an interpolation iterator.

In some implementations of the current subject matter, the iterator can perform a difference transformation between adjacent values in a stream of time series data from the time series database. A starting margin can be used to extend the start of the query time range to allow for first data point difference. The difference transformation can be applied to only numeric time series data and can return all of the configured fields with their original data type. As with an interpolation iterator or a consumption interpolation iterator, the difference iterator can replace the data type sentinels with a NaN in order to avoid skewing the results. Additional sentinels can also be configured if needed. Table 8 below provides a description of the parameters for configuring an iterator for performing a difference transformation.

TABLE 8

| Field | Type | Description |
| --- | --- | --- |
| type | String | The iterator transform type. Set to difference. |
| start_margin | Integer | The margin before the specified query start to use for the difference of the first configured timestep |
| additional_sentinels | Array | The array of additional sentinels to ignored |

In some implementations of the current subject matter, the iterator can perform a calculated difference transformation by adding support difference of Boolean fields such as, for example, the calculated fields returned by an interpolation iterator. The Boolean difference can compute the union of adjacent fields as shown Table 9 below. It should be appreciated that the parameters for configuring a calculated difference iterator can be the same as those for configuring a difference iterator.

TABLE 9

| Value N-1 | Value N | Result |
|---|---|---|
| 0 | 0 | 0 |
| 0 | 1 | 1 |
| 1 | 0 | 1 |
| 1 | 1 | 1 |

FIG. 6E depicts programming code 650 for implementing a query configuration consistent with implementations of the current subject matter. Referring to FIG. 6E, the client 190 can input, via the user interface 120, the programming code 650 in order to specify the data selection for the customized query including, for example, identifying the sensor system 160 as the source of the time series data to be queried. Table 10 below provides a description of the parameters in the programming code 650.

TABLE 10

| Field | Type | Description |
|---|---|---|
| name | String | Regular expression for system names to retrieve |
| part_of_node_path | Boolean | Set to true if the system name is also part of the node path. This minimizes the regular expression needed to match nodes to systems. If set to false, care must be taken to construct node path regular expressions that only return the nodes that are present in the configured system names. Lookaround expressions can be useful for this (e.g. (?=^FCTY_HOUSING\/.*$)(?!(^.*\/UNKNOWNS\/.*$)),looks for all nodes starting with FCTY_HOUSING/but ignores those nodes with /UNKNOWNS/in the path). |
| nodes | Array | The array of nodes and fields to query |

FIG. 6F depicts programming code 660 for implementing a query configuration consistent with implementations of the current subject matter. Referring to FIG. 6E, the client 190 can input, via the user interface 120, the programming code 660 in order to further specify the data selection for the customized query including, for example, identifying specific sensors within the sensor system as being the sources of the time series data to be queried. Table 11 below provides a description of the parameters in the programming code 660.

TABLE 11

| Field | Type | Description |
|---|---|---|
| path | String | Regular expression for node paths to retrieve |
| fields | Array | The array of fields to query |
| name | String | Regular expression for fields to retrieve |

FIG. 6G depicts programming code 670 for implementing a query configuration consistent with implementations of the current subject matter. Referring to FIG. 6G, the client 190 can input, via the user interface 120, the programming code 670 in order to configure the output of a customized query. Table 12 below provides a description of the parameters for output configuration in the programming code 670. As shown in Table 12, the output of executing a customized query can be adapted using an elastic search output adaptor and/or a trex output adaptor.

TABLE 12

| Output Adapter | Description |
|---|---|
| elasticsearch | Provides the elasticsearch_interface to use for the configured Elasticsearch connection |
| trex | Provides the trex_interface to use for the configured T-REX connection |

Table 13 below provides a description of the parameters for configuring an elastic search output adaptor.

TABLE 13

| Field | Type | Description |
|---|---|---|
| id | String | The unique identifier for the configuration item |
| type | String | The output adapter type. Set to elasticsearch. |
| elasticsearch | String | Specifies the id of the Elasticsearch configuration to associate with the output adapter |

TABLE 13-continued

| Field | Type | Description |
|---|---|---|
| document_configuration | String | Specifies the id of the document configuration to associate with the output adapter |

Table 14 below provides a description of the parameters for configuring a trex output adaptor.

TABLE 14

| Field | Type | Description |
|---|---|---|
| id | String | The unique identifier for the configuration itemt |
| type | String | The output adapter type. Set to elasticsearch. |
| connection | String | Specifies the id of the T-REX configuration to associate with the output adapter |
| output_dir | String | Not used |

TABLE 14-continued

| Field | Type | Description |
| --- | --- | --- |
| node_cache_include_regex | String | Regular expression for node paths to include in the node cache |
| node_cache_exclude_regex | String | Regular expression for node paths to exclude in the node cache |

Figure 6H:
FIG. 6H depicts programming code implementing a query configuration consistent with implementations of the current subject matter.

FIG. 6H depicts programming code 680 for implementing a query configuration consistent with implementations of the current subject matter. Referring to FIG. 6H, the client 190 can input, via the user interface 120, the programming code 680 in order to specify the processing algorithm that is applied by a customized query. Table 15 below provides a description of the parameters set forth in the programming code 680 for specifying the processing algorithm.

TABLE 15

| Field | Type | Description |
| --- | --- | --- |
| query_set_id | String | Specifies the id of the query set configuration to associate with the function |
| module | String | The fully qualified module name found via the Python path |
| function | String | The function name to use in the module. The function must inherit from FrameworkFunction |
| output_adapter | String | Specifies the id of the output adapter configuration to associate with the function |
| params | Array | The array of params for the configured function. The options supported in the params array are defined by the implementations of the FrameworkFunction |

FIG. 6I depicts programming code 690 for implementing a query configuration consistent with implementations of the current subject matter. Referring to FIG. 6I, the client 190 can input, via the user interface 120, the programming code 690 in order to specify the document configuration for a customized query. Table 16 below provides a description of the parameters set forth in the programming code 690 for specifying the document configuration of a customized query. The document configuration for a query can specify how an output of the query should be stored.

TABLE 16

| Field | Type | Description |
| --- | --- | --- |
| id | String | The unique identifier for the configuration item |
| name | String | A display name for the configuration item |
| index | String | Specifies the Elasticsearch index that the document will be written to |
| index_type | String | Specifies the Easticsearch document type of the document |
| type_mapping | Dictionary | Dictionary of field type mappings. Includes data type, indexing details, etc. |
| unique_id_fields | Array | Array of field names in the document that will be hashed to produce a reproducible unique key for the document. |
| required_fields | Array | Array of field names in the document that are required. An exception will be thrown if the required fields are not in the document. |

Figure 6J:
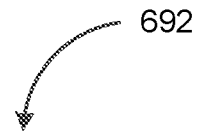
FIG. 6J depicts programming code implementing a query configuration consistent with implementations of the current subject matter.

FIG. 6J depicts programming code 692 for implementing a query configuration consistent with implementations of the current subject matter. Referring to FIG. 6J, the client 190 can input, via the user interface 120, the programming code 692 in order to configure the metadata that is generated when executing a customized query. Table 17 below provides a description of the parameters set forth in the programming code 692 for specifying configuring the metadata associated with the execution of a customized query.

TABLE 17

| Field | Type | Description |
| --- | --- | --- |
| systems | Array | Array of regular expressions that identify the T-REX systems associated with the metadata |
| trex-id | String | Specifies the id of the T-REX connection configuration to associate with the metadata. |
| elasticsearch_id | String | A display name for the configuration item |
| index | String | Specifies the Elasticsearch index containing the metadata documents for the configured systems |
| index_type | String | Specifies the Elasticsearch document type of the metadata document |
| valid_from_field | String | Specifies the field containing the metadata version timestamp |

Figure 6K:
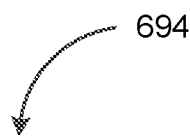
FIG. 6K depicts programming code implementing a query configuration consistent with implementations of the current subject matter.

FIG. 6K depicts programming code 694 for implementing a query configuration consistent with implementations of the current subject matter. Referring to FIG. 6K, the client 190 can input, via the user interface 120, the programming code 694 in order to specify the internal configuration item that define an elastic search connection and location information for the optional internal document containing the start and end time fields to consider during real time mode operation. The times can be compared to the calculated start and end to determine if the time range of a customized query is extended. The programming code 694 is typically used when two applications run in series. Table 18 below provides a description of the parameters set forth in the programming code 690 for specifying the document configuration of a customized query.

TABLE 18

| Field | Type | Description |
| --- | --- | --- |
| elaticsearch_id | String | A display name for the configuration item |
| index | String | Specifies the Elasticsearch index containing the internal document |
| doc_type | String | Specifies the Elasticsearch document type of the internal document |

TABLE 18-continued

| Field | Type | Description |
| --- | --- | --- |
| doc_id | String | Specifies the id of the internal document. This must be the same id used by the application that created the Elasticsearch document. |

Figure 7:
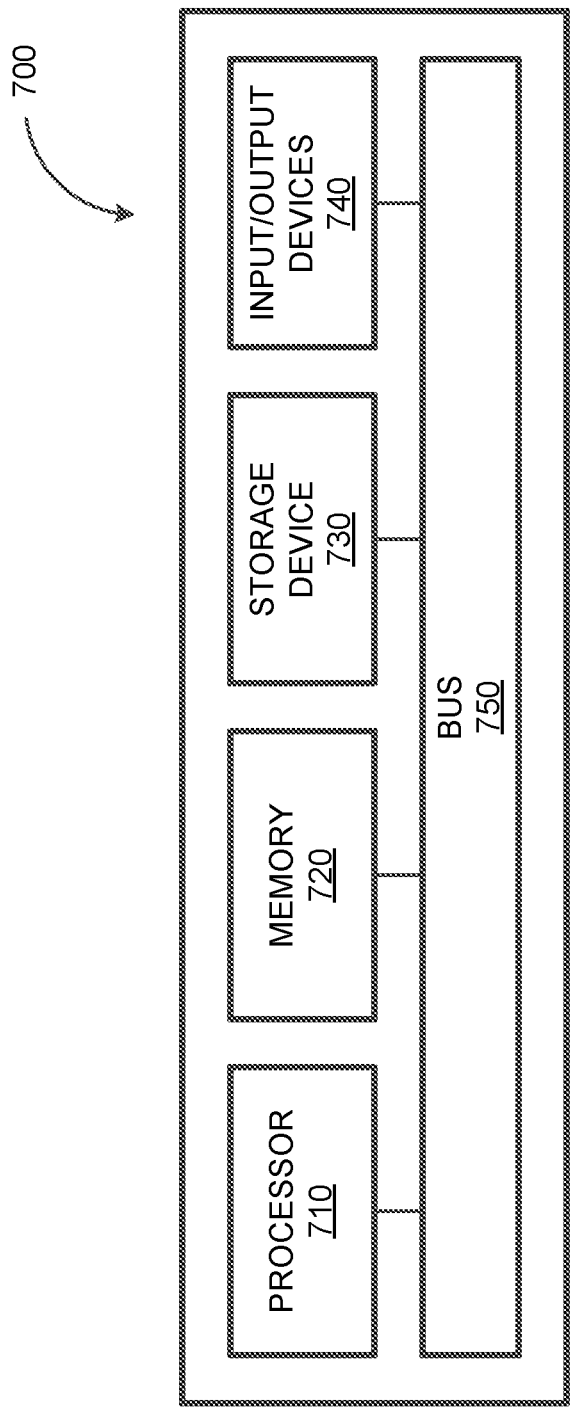
FIG. 7 depicts a block diagram illustrating a computing system, in accordance with some example embodiments.

FIG. 7 depicts a block diagram illustrating a computing system 700 consistent with implementations of the current subject matter. Referring to FIGS. 1-7, the computing system 700 can be used to implement the time series database system 100 and/or any components therein.

As shown in FIG. 7, the computing system 700 can include a processor 710, a memory 720, a storage device 730, and input/output devices 740. The processor 710, the memory 720, the storage device 730, and the input/output devices 740 can be interconnected via a system bus 750. The processor 710 is capable of processing instructions for execution within the computing system 700. Such executed instructions can implement one or more components of, for example, the database system 100 and/or the multitenant database system 200. In some example embodiments, the processor 710 can be a single-threaded processor. Alternately, the processor 710 can be a multi-threaded processor. The processor 710 is capable of processing instructions stored in the memory 720 and/or on the storage device 730 to display graphical information for a user interface provided via the input/output device 740.

The memory 720 is a computer readable medium such as volatile or non-volatile that stores information within the computing system 700. The memory 720 can store data structures representing configuration object databases, for example. The storage device 730 is capable of providing persistent storage for the computing system 700. The storage device 730 can be a floppy disk device, a hard disk device, an optical disk device, or a tape device, or other suitable persistent storage means. The input/output device 740 provides input/output operations for the computing system 700. In some example embodiments, the input/output device 740 includes a keyboard and/or pointing device. In various implementations, the input/output device 740 includes a display unit for displaying graphical user interfaces.

According to some example embodiments, the input/output device 740 can provide input/output operations for a network device. For example, the input/output device 740 can include Ethernet ports or other networking ports to communicate with one or more wired and/or wireless networks (e.g., a local area network (LAN), a wide area network (WAN), the Internet).

In some example embodiments, the computing system 700 can be used to execute various interactive computer software applications that can be used for organization, analysis and/or storage of data in various formats. Alternatively, the computing system 700 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 740. The user interface can be generated and presented to a user by the computing system 700 (e.g., on a computer screen sensor, etc.).

One or more aspects or features of the subject matter described herein can be realized in digital electronic circuitry, integrated circuitry, specially designed ASICs, parameter programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) sensor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   receiving time series data collected by a first sensor;
   storing the time series data collected by the first sensor in a first data array associated with the first sensor, the first data array being stored proximate to a second data array, the second data array including time series data collected by a second sensor, the first data array being stored proximate to the second data array based at least on the first sensor and the second sensor being in a first sensor group, the first data array being stored proximate to the second data array further based on the first data array and the second data array including time series data spanning a same time period;
   receiving a query to perform a processing algorithm on a first subset of time series data;
   generating the first subset of time series data by at least retrieving the first data array and the second data array, time series data spanning a different time period being included in a second subset of time series data, the second subset of time series data including a third data array that includes the time series data collected by the first sensor and a fourth data array that includes the time series data collected by the second sensor; and
   executing the query by at least applying the processing algorithm to the first subset of time series data.

2. The system of claim 1, wherein the generation of the first subset of time series data comprises adding the first data array and the second data array to the first subset of time series data.

3. The system of claim 1, wherein the generation of the first subset of time series data comprises:
   filtering, based on one or more filter criteria, the first data array and the second data array, the one or more filter criteria excluding the time series data collected by the first sensor; and
   adding, to the first subset of time series data, a filtered selection of time series data, the filtered selection of time series data excluding the first data array.

4. The system of claim 3, wherein the one or more filter criteria comprise sensor attributes.

5. The system of claim 1, wherein the generation of the first subset of time series data comprises grouping, based on one or more grouping criteria, the first data array and the second data array, and wherein the one or more grouping criteria group the first data array and the second data array into a same group and/or different groups.

6. The system of claim 5, wherein the one or more grouping criteria comprise sensor attributes.

7. The system of claim 1, wherein the first data array and the second data array are stored at proximate memory addresses and/or proximate disk sectors.

8. The system of claim 1, wherein the first data array and the second data array are further stored with a fifth data array including a plurality of timestamps corresponding to the time series data collected by the first sensor and/or the time series data collected by the second sensor.

9. The system of claim 8, wherein the execution of the query further comprises retrieving the fifth data array.

10. The system of claim 1, wherein the first sensor and the second sensor are configured to perform measurements over a continuous time interval.

11. The system of claim 1, wherein the first sensor and the second sensor are configured to perform measurements at a same sampling rate.

12. The system of claim 1, wherein the first sensor and the second sensor are included in the first sensor group based at least on the first sensor and the second sensor being located in a same geographic region, being at a same hierarchy level, and/or performing a same type of measurement.

13. The system of claim 1, further comprising:
   receiving time series data collected by a third sensor;
   storing the time series data collected by the third sensor in a fifth data array associated with the third sensor, the fifth data array being stored separately from the first data array and/or the second data array based at least on the third sensor being in a second sensor group.

14. A method, comprising:
   receiving time series data collected by a first sensor;
   storing the time series data collected by the first sensor in a first data array associated with the first sensor, the first data array being stored proximate to a second data array, the second data array including time series data collected by a second sensor, the first data array being stored proximate to the second data array based at least on the first sensor and the second sensor being in a first sensor group, the first data array being stored proximate to the second data array further based on the first data array and the second data array including time series data spanning a same time period;

receiving a query to perform a processing algorithm on a first subset of time series data;

generating the first subset of time series data by at least retrieving the first data array and the second data array, time series data spanning a different time period being included in a second subset of time series data, the second subset of time series data including a third data array that includes the time series data collected by the first sensor and a fourth data array that includes the time series data collected by the second sensor; and executing the query by at least applying the processing algorithm to the first subset of time series data.

15. The method of claim 14, wherein the generation of the first subset of time series data comprises adding the first data array and the second data array to the first subset of time series data.

16. The method of claim 14, wherein the generation of the first subset of time series data comprises:

filtering, based on one or more filter criteria, the first data array and the second data array, the one or more filter criteria excluding the time series data collected by the first sensor; and adding, to the first subset of time series data, a filtered selection of time series data, the filtered selection of time series data excluding the first data array.

17. The method of claim 16, wherein the one or more filter criteria comprise sensor attributes.

18. The method of claim 14, wherein the generation of the first subset of time series data comprises grouping, based on one or more grouping criteria, the first data array and the second data array, and wherein the one or more grouping criteria group the first data array and the second data array into a same group and/or different groups.

19. The method of claim 18, wherein the one or more grouping criteria comprise sensor attributes.

20. The method of claim 14, wherein the first data array and the second data array are stored at proximate memory addresses and/or proximate disk sectors.

21. The method of claim 14, wherein the first data array and the second data array are further stored with a fifth data array including a plurality of timestamps corresponding to the time series data collected by the first sensor and/or the time series data collected by the second sensor.

22. The method of claim 21, wherein the execution of the query further comprises retrieving the fifth data array.

23. The method of claim 14, wherein the first sensor and the second sensor are configured to perform measurements over a continuous time interval.

24. The method of claim 14, wherein the first sensor and the second sensor are configured to perform measurements at a same sampling rate.

25. The method of claim 14, wherein the first sensor and the second sensor are included in the first sensor group based at least on the first sensor and the second sensor being located in a same geographic region, being at a same hierarchy level, and/or performing a same type of measurement.

26. The method of claim 14, further comprising:

receiving time series data collected by a third sensor;

storing the time series data collected by the third sensor in a fifth data array associated with the third sensor, the fifth data array being stored separately from the first data array and/or the second data array based at least on the third sensor being in a second sensor group.

27. A non-transitory computer-readable storage medium including program code, which when executed by at least one data processor, cause operations comprising:

receiving time series data collected by a first sensor;

storing the time series data collected by the first sensor in a first data array associated with the first sensor, the first data array being stored proximate to a second data array, the second data array including time series data collected by a second sensor, the first data array being stored proximate to the second data array based at least on the first sensor and the second sensor being in a first sensor group, the first data array being stored proximate to the second data array further based on the first data array and the second data array including time series data spanning a same time period;

receiving a query to perform a processing algorithm on a first subset of time series data;

generating the first subset of time series data by at least retrieving the first data array and the second data array, time series data spanning a different time period being included in a second subset of time series data, the second subset of time series data including a third data array that includes the time series data collected by the first sensor and a fourth data array that includes the time series data collected by the second sensor; and executing the query by at least applying the processing algorithm to the first subset of time series data.

* * * * *